United States Patent [19]

Wilks et al.

[11] 4,302,124

[45] Nov. 24, 1981

[54] CONNECTORS

[76] Inventors: Gerhard Wilks, Seilermeister Braunstrasse 43; Gunter Grossmann, Werkzeugmacher Kotzenbruhlstr. 8, both of 8940 Memmingen; Franz Sanz, Werkzeugmacher Anton-Kanz-Str. 10, 7918 Illertissen, all of Fed. Rep. of Germany

[21] Appl. No.: 58,178

[22] Filed: Jul. 17, 1979

[30] Foreign Application Priority Data

Jul. 22, 1978 [DE] Fed. Rep. of Germany ....... 2832300

[51] Int. Cl.³ .............................................. A44B 21/00
[52] U.S. Cl. ...................................... 403/391; 245/3; 403/400
[58] Field of Search ............... 403/391, 400, 392, 394, 403/399, 398; 294/77; 410/97, 118; 245/3

[56] References Cited

U.S. PATENT DOCUMENTS

| 381,137 | 4/1888 | Hodges | 403/391 X |
|---|---|---|---|
| 552,990 | 1/1896 | Dickerson | 403/396 |
| 683,672 | 10/1901 | Wellman | 403/396 |
| 3,077,969 | 2/1963 | Raffe | 403/400 X |
| 3,903,574 | 9/1975 | Fraioli | 403/399 X |

Primary Examiner—Andrew V. Kundrat
Attorney, Agent, or Firm—Holman & Stern

[57] ABSTRACT

The subject of this invention is a connector used to connect or clamp together at least two strands, as for example at the nodes or crossings in a net. To make the connector of little bulk and obtrusiveness, while still giving a secure jointing effect, it is provided by a blank which is shaped to furnish openings or passages for reception of the crossing or adjacent strands and is deformed under pressure to enclose and grip these strands at their junction in a small coherent body of small overall dimension.

3 Claims, 14 Drawing Figures

CONNECTORS

BRIEF SUMMARY OF THE INVENTION

This invention relates to the interconnection of cables, ropes, wires or like (all hereinafter included in the term "strands" unless the context otherwise admits) at points where they intersect or adjoin one another.

A typical example of this interconnection is found in the case of nets, such as those made of wire cables or textile ropes which are used as climbing nets, for instance in children's playgrounds or the like.

If the construction of the net is such that parts of the strands can run in parallel at the nodal points of the net they can be interconnected by clamping sleeves, for example of known oval form, into which the strands are threaded. After this threading the clamping sleeves are plastically deformed under pressure to produce a firm jointing of the two strands. The threading procedure involves disadvantages although these can be to some extent avoided by using c-shaped clamping means which are deformed similarly to the aforementioned oval clamping sleeve so that two or even more strands, e.g. ropes or cables, passing therethrough can be firmly connected together. Moreover an adjacent grip can be applied by such clamping means.

When however the strands cross at right angles the aforesaid means can no longer be used. In this instance to provide an interconnection at the intersections it is known to thread the strands through a ring which is disposed in the plane determined by the crossing lengths and the latter are introduced through the ring in such a way that it in each case is clamped between one outer face of the ring and the other strand length.

Threading into the ring in this way is however awkward. If for example a netting structure is to be made from a single length of cable or rope it is necessary to pull the whole of the cable or rope to be plaited through the ring each time. Since the dimensions of the ring is made very narrow to increase the mutual clamping effect this operation is very troublesome and extremely time wasting.

There is an arrangement which can be used for clamping intersecting cable lengths. The clamping device used here comprises essentially two parts. The first part comprises a plate with four pliable lugs which are arranged star fashion and which, after being bent, embrace the crossing lengths of rope against the other part of the device, a counter plate, so that the lengths of cable, fed in diagonally, are clamped between the two plates. The bendable lugs have to be comparatively thin in this arrangement so as to allow for bending without breaking. As a result the grip is very limited.

Protection against corrosion is also difficult in this prior arrangement. If for example galvanised steel plates are used for the parts of the clamping device, the surface protection is immediately damaged during the bending of the lugs. The use of aluminium or other less corrosion-prone material is no solution because of the reduced grip of these materials.

It is an object of the present invention to provide means for connecting strands of ropes or cables, particularly where used in a net construction, which can readily be produced.

A further object is to devise a connector for the purpose indicated which is simple and inexpensive to produce and in which the expenditure in assembly is small.

Another object is to provide an arrangement which will give an absolutely secure connection at the crossing or intersection point which will be adequate to sustain those forces which are likely to be applied through the rope, cable, or other strands.

In meeting this object the present invention provides a connector for the purposes described above which is formed from a blank of unitary construction having at each of the opposite sides thereof a U-shaped passage-forming opening for each of the two strands, the orientation of the openings being suited to the orientation of the strands, and after deformation of the blank, in which the walls bounding the openings are pressed against one another to form a ring enclosing each strand, the outer dimensions of the connector are substantially the same overall.

This expedient provided by the invention is surprisingly simple. The connector may for example be of aluminium, but alternatively of other materials which can be deformed under pressure. In special cases for example a steel connector can be used. There is only a single body involved and this accelerates the assembly. In this assembly the strands have only to be laid in the openings whereafter the connector is deformed to produce a firm and safe connection of the latter to the strands and these latter to the connector itself.

It is of particular advantage that the compression of the connector blank, and thus the creation of the clamping effect, can be performed in a single operation for the two strands concerned. There is a specific opening for each strand and even in the case, say, of cables which are difficult to work or manipulate a firm and secure fixing of the cable in the connector can be achieved.

It is particularly favourable in this invention that the connector can be of small dimensions only and further that it is readily possible to avoid sharp edged surfaces at the exterior of the connector. Consequently the use of these connectors will change the outer aspect of a net structure only very little and the danger of injury or damage is small, which is of importance particularly in the case of a climbing net.

Where it is required to connect two crossing strands, i.e. lengths of cable, the openings referred to can be arranged in cruciform fashion relatively to one another at the two sides of the connector. In this case it may be of advantage to adopt an arrangement in which the two aforesaid openings merge partly into one another which means that in the finished joint the two cable lengths will deform one another to a partial extent. This further reduces the external dimensions.

The same clamped connection of this invention can also be used to join strands which run parallel to one another, and there is no problem in cases where the strands are run at an acute angle to one another at the point of intersection.

The invention may not only be used for climbing nets or the like, but in nets for other purposes, for example loading nets, nets for building construction, and so on. It can also be used in other strandconnecting situations.

These features of the invention are disclosed in the ensuing description of a number of embodiments of the invention which have been diagrammatically illustrated in the accompanying drawings.

DETAILED DESCRIPTION

The connector of this invention is preferably made of aluminium, but other materials can be used, for example steel or even a plastics material. In the latter case a heating process can be used for the deformation of the unit (see below).

Figure 1:
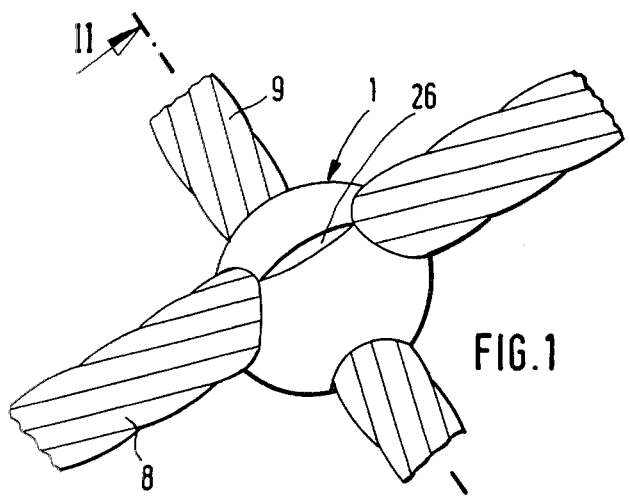
FIG. 1 is a perspective illustration of the clamping connection of two crossing cables by means of a connector according to the invention.
Figure 2:
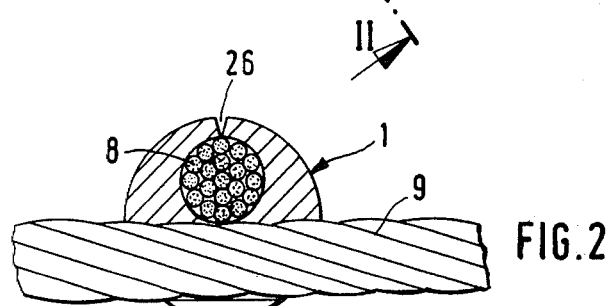
FIG. 2 is a cross section through the arrangement illustrated in FIG. 1, taken on the line II—II.
Figure 3:
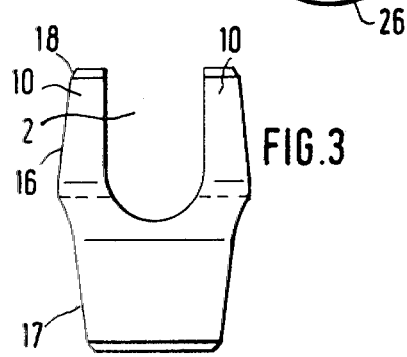
FIGS. 3–6 are respectively two front views, a plan view and a bottom view of the connector illustrated in FIGS. 1 and 2, prior to use.
Figure 4:
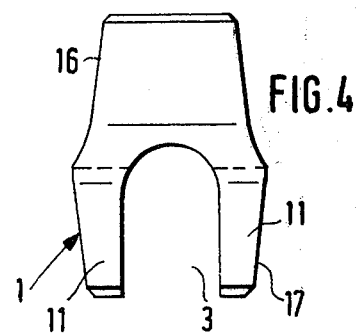
Figure 5:
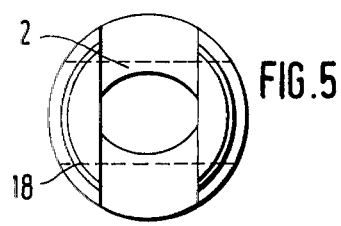
Figure 6:
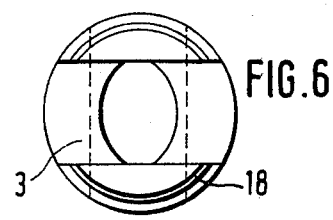
Figure 7:
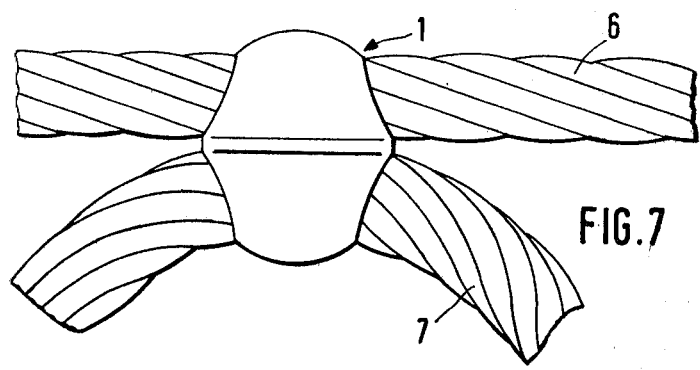
FIG. 7 is a side view of a modified form of connector according to the invention, this shown in operative assembled condition.
Figure 8:
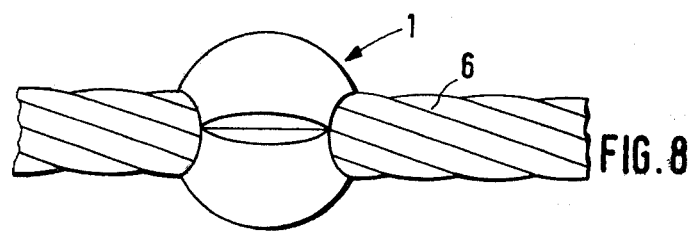
FIG. 8 is a top plan view of the arrangement illustrated in FIG. 7, FIGS. 9–11 are respectively two side views and a plan view of the connector illustrated in FIGS. 7 and 8, prior to use.

The connector 1 illustrated in FIGS. 1–6 is, when assembled and operated, basically a body of rotation and its shape is derived from an embryo form which may be regarded as a double cone, namely the two cones 16 and 17 (FIGS. 3 and 4). The angle of taper of each of these conical formations is about 15°, but fluctuations between 10° and 20° are possible. This choice means a favourable relation between the outer dimensions of the finished product, on the one hand, and the deformation forces which have to be applied to produce this finished status. The double cone is provided with the openings 2 and 3, these being chosen of a depth such that their sum somewhat exceeds the full height of the finished article. This achieves the result that these openings 2 and 3 in effect penetrate into the central area and this method of construction means that the cable lengths 8 and 9 are deformed at their point of contact with the advantage that the total dimensions of the connector are somewhat reduced in the final condition. The opening 2 is defined by the walls 10 and opening 3 by walls 11. It is recommended that bevelled parts 18 are provided at the upper and lower ends of the connector workpiece which is to be deformed.

Figure 14:
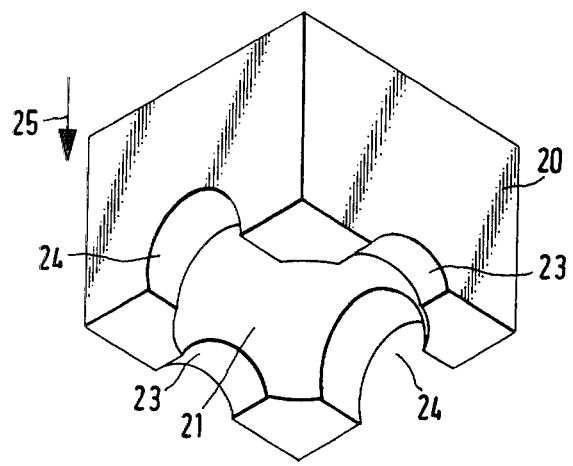
FIG. 14 is a perspective view of a tool which can be used to deform the connector of the present invention.
Figure 14:
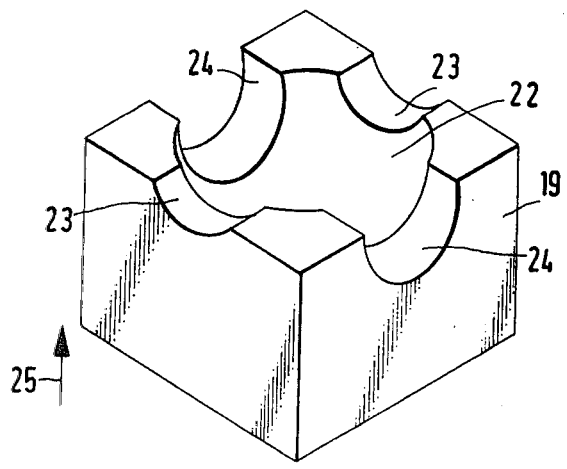

In making a clamped connection between two crossing cables one of these, for example 8, is laid in the opening 2, whilst opening 3 receives the other cable length 9. This preparatory joint is placed in a tool which can be made up of two substantially like parts, as illustrated in FIG. 14. Each of the two parts 19 and 20 of the tool has a semi-spherical recess 21 and 22 respectively and each of the walls defining these recesses 21 and 22 are provided with semi-spherical apertures 23 and 24 respectively. The crossing cable parts with the undeformed connector are introduced into the tool in such a way that for example the lower length of cable 9 is placed in the larger aperture 24 and the two parts of the tool 19 and 20 co-act in such a way that the apertures 23 and 24 always supplement one another.

When appropriate pressure is applied in the directions of arrows 25 the connector 1 is so deformed as to assume a spherical sort of shape. The walls 10 and 11 are brought together until they touch. In the completed comdition a small oppositely disposed wedge-shaped gaps 26 are left. The completed connector has only comparatively small dimensions which are more or less equal in all directions. In all cases the gripping force which is achieved is adequate.

Particularly favourable in the implementation of the invention is the fact that, as for example is illustrated in FIG. 2, the base of the deformed walls 10 and 11 is comparatively wide so that although the walls only touch after the deformation and are not welded to one another or otherwise positively connected, a powerful grip is achieved.

The pressures on which the grip depends are adapted to the cable or rope lengths which are being dealt with in appropriate cases. If wire cables are the subject of the operation it will be possible to use higher pressures than, for example, in the case of ropes of textile fibres or cables of which the outer surface is constituted by textile fibres.

Figures 9, 10:
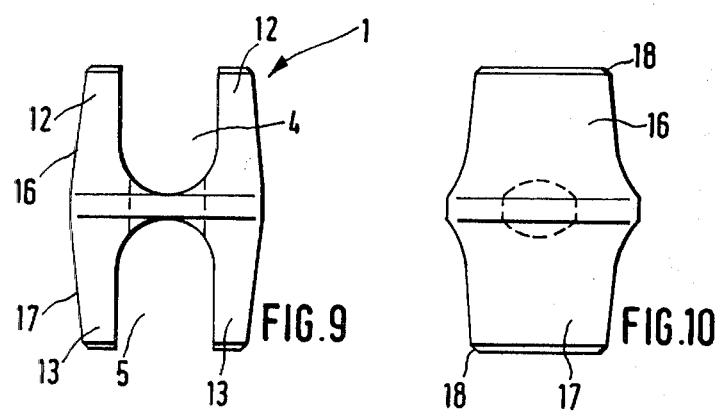

Whereas FIGS. 1 to 6 illustrate an embodiment in which two crossing lengths of cable 8 and 9 are connected, FIGS. 7 to 11 illustrate a variation dealing with parallel lengths of cable 6 and 7. In this case the connector I likewise has two U-shaped openings 4 and 5 which however, see FIG. 9, are parallel to one another. With this construction it is not possible for the openings to pass mutually into one another because this would divide the connector. However, to cater for optimum deformability it is of advantage to provide a channel 14 internally of the connector. The form of the outer faces of the double cones 16 and 17 and the application of the bevelling 18 correspond to the embodiment of FIGS. 1 to 6 described above.

On account of the specifics of the constructional form of FIGS. 7 to 11 the finished connector 1 deviates in this case somewhat more from the spherical or ball shape. The dimensions are slightly greater in the plane of the two cable lengths 6 and 7 than at right angles thereto, for example. These distinctions are however minor.

It has been found that the connector of FIGS. 7 to 11 can be deformed and finished with the same tool as that used in the embodiment referred to in FIGS. 1 to 6. It is only necessary to turn the part 20 of the tool through 90° relatively to the part 19 so that the apertures 23 and the apertures 24 are brought into appropriate register with one another. In this particular instance the apertures 23 have no function and at the end of the pressing operation the tools will retain a spacing from one another.

Figure 11:
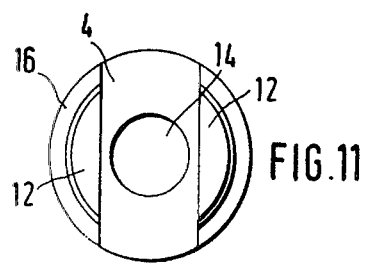
Figure 12:
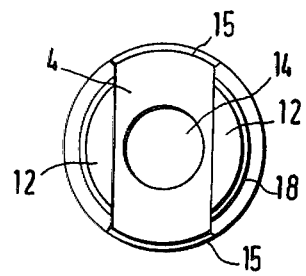
FIGS. 12 and 13 are respectively a plan view and side view of a further modified version of the connector of this invention, prior to use.
Figure 13:
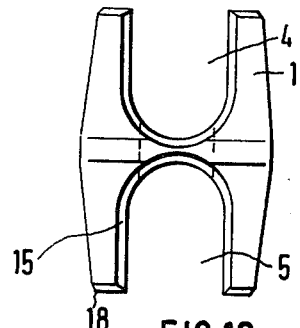

FIGS. 12 and 13 indicate a variation of connector of FIGS. 9 to 11 in which the boundaries of the walls 12 and 13 defining the U-shaped openings 4 and 5 are bevelled at 15. This bevelling will be conserved when the clamping by the connector is complete. Such bevelling somewhat improves the motion of the cable held in the connector and avoids the danger that the boundaries of the outer walls will, if sharp-edged, cut into the cable or rope. The bevelling 15 could of course also be used for a connector in which the U-shaped openings cross, as in the case of openings 2 and 3 of the embodiment illustrated in FIGS. 1 to 6 of the drawings.

Where reference is made in connection with this invention to a spherical shape assumed by the connector after deformation this is not meant to indicate a perfect geometrical spherical shape. There are bodies of rotation of spherical type in which there are differences between the individual outer dimensions. Whilst a curved outer shape is as a rule to be preferred in the finished connector as conferring the best results, outer shapes can nevertheless be used which are composed of individual plane surfaces or surfaces which have a curvature which is shallower than a proper spherical shape.

We claim:

1. In a connector for connecting together two strands of cables, ropes or the like, wherein an integral deformable connecting member blank has a plurality of grooves therein to receive said strands and is deformed to secure said strands in said grooves, the improvement comprising said blank being made of pressure-deformable material and having an exterior shape in the form of a double cone made by two truncated cones joined at their bases and a cone angle between 10° and 20°, a U-shaped slot extending from each oppositely disposed face of said blank toward the middle thereof, each slot having a width substantially equal to the diameter of the strands to be received therein and being curved at its inner end to substantially conform to the configuration of the strand to be received therein, said shape and size of said blank being predetermined according to the size of said strands so that upon deformation of said blank to secure said strands in said slots by a die means, the sides of said slots will firmly engage said strands and the blank will be of substantially spherical shape.

2. The connector as claimed in claim 1 wherein said slots form two pairs of legs, each pair being oppositely disposed with respect to the other pair and having a length so that when deformed said legs are wrapped around said strands with the end of each pair just touching.

3. The connector as claimed in claim 2 wherein said slots are disposed at approximately 90° with respect to each other and extend beyond the middle of the blank to interengage thereby forming an opening to facilitate said strands contacting each other under pressure when said blank is deformed.

* * * * *